United States Patent
Hu

(10) Patent No.: US 8,553,498 B2
(45) Date of Patent: Oct. 8, 2013

(54) Q TOMOGRAPHY METHOD

(75) Inventor: Wenyi Hu, Katy, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 338 days.

(21) Appl. No.: 13/071,255

(22) Filed: Mar. 24, 2011

(65) Prior Publication Data

US 2011/0273961 A1    Nov. 10, 2011

Related U.S. Application Data

(60) Provisional application No. 61/331,694, filed on May 5, 2010.

(51) Int. Cl.
  *G01V 1/28*  (2006.01)
  *G01V 1/30*  (2006.01)

(52) U.S. Cl.
  CPC ..................................... *G01V 1/282* (2013.01)
  USPC .................. 367/47; 367/38; 367/73; 702/14; 702/17

(58) Field of Classification Search
  USPC ...................... 367/38, 47, 49, 73; 702/14, 17
  See application file for complete search history.

(56) References Cited

U.S. PATENT DOCUMENTS

| | | |
|---|---|---|
| 5,089,994 A | 2/1992 | Harlan et al. |
| 5,479,376 A | 12/1995 | Gonzalez et al. |
| 5,555,218 A | 9/1996 | Chambers et al. |
| 5,570,321 A | 10/1996 | Bernitsas |
| 6,049,759 A | 4/2000 | Etgen |
| 6,332,109 B1 | 12/2001 | Sheard et al. |
| 6,665,615 B2 | 12/2003 | Van Riel et al. |
| 6,876,928 B2 | 4/2005 | Van Riel et al. |
| 6,931,324 B2* | 8/2005 | Taner et al. ..................... 702/17 |
| 7,040,169 B2 | 5/2006 | Tutuncu et al. |
| 7,088,639 B2 | 8/2006 | Walls et al. |
| 7,117,093 B2 | 10/2006 | Stinson et al. |
| 7,230,879 B2 | 6/2007 | Herkenhoff et al. |
| 7,376,517 B2 | 5/2008 | Rickett |

(Continued)

FOREIGN PATENT DOCUMENTS

| | | |
|---|---|---|
| EP | 0809122 | 10/2001 |
| GB | 2432214 | 5/2007 |
| WO | WO 2006/025823 | 3/2006 |
| WO | WO 2007/094676 | 3/2007 |

OTHER PUBLICATIONS

Bierlaire, M. et al. 1(991), "On iterative algorithms for linear least squares problems with bound constraints," Linear Algebra Appl. 143, pp. 111-143.

(Continued)

*Primary Examiner* — Ian J Lobo
(74) *Attorney, Agent, or Firm* — ExxonMobil Upstream Research Company Law Dept.

(57) ABSTRACT

Method for reconstructing subsurface Q models (110) from seismic data (10) by performing ray-based (60), centroid frequency shift (50) Q tomography. The seismic source waveform's amplitude spectrum is approximated by a frequency-weighted exponential function of frequency (40), having two parameters to adjust to fit the frequency shift data, thereby providing a better fit to various asymmetric source amplitude spectra. Box constraints may be used in the optimization routine, and a multi-index active-set method used in velocity tomography is a preferred technique for implementing the box constraints (100).

20 Claims, 7 Drawing Sheets
(4 of 7 Drawing Sheet(s) Filed in Color)

(56) References Cited

U.S. PATENT DOCUMENTS

| | | |
|---|---|---|
| 7,418,350 B2 | 8/2008 | Stinson et al. |
| 7,480,206 B2 | 1/2009 | Hill |
| 2004/0068376 A1 | 4/2004 | Aronstam |
| 2004/0122596 A1 | 6/2004 | Sudhakar et al. |
| 2006/0265132 A1 | 11/2006 | Rickett |
| 2008/0312838 A1 | 12/2008 | Cavalca et al. |
| 2009/0120634 A1 | 5/2009 | Liu et al. |

OTHER PUBLICATIONS

Delbos, D. et al. (2006), Constrained optimization in seismic reflection tomography: a Gauss-Newton augmented Lagrangian approach, *Geophysics*, 164, pp. 670-684.

Gao, F. et al. (2005), "Seismic velocity, Q, geological structure and lithology estimation at a ground water contamination site," 75th SEG, Expanded Abstracts, pp. 1561-1564.

Hicks, G. J. et al. (2001), "Reflection waveform inversion using local descent methods: Estimating attenuation and velocity over a gas-sand deposit," *Geophysics* 66, pp. 598-612.

Liao, Q. et al. (1996), "Multifrequency viscoacoustic modeling and inversion," *Geophysics* 61(5), pp. 1371-1378.

Morigi, S. (2007), "An iterative method for linear discrete ill-posed problems with box constraints," *J. of Computational and Applied Mathematics* 198, pp. 505-520.

Paige, C. C. (1982), "LSQR: An algorithm for sparse linear equations and sparse least squares," *ACM Trans. Math. Software* 8, pp. 43-71.

Plessix, R.E. (2006), "Estimation of velocity and attenuation coefficient maps from crosswell seismic data," *Geophysics* 71, pp. S235-S240.

Pratt, R.G. (2003), "Crosshole waveform tomography velocity and attenuation images of arctic gas hydrates," 73rd SEG, Expanded Abstracts, pp. 2255-2258.

Quan, Y. (1997), "Seismic attenuation tomography using the frequency shift method," *Geophysics* 62, pp. 895-905.

Rossi, G., (2007), "Attenuation tomography: An application to gas-hydrate and free-gas detection," *Geophysics* 55, pp. 655-669.

Spencer, T.W.(1982), "Seismic Q-stratigraphy or dissipation," *Geophysics* 47, pp. 16-24.

Tonn, R. (1991), "The determination of the seismic quality factor Q from VSP data: A comparison of different computational method," *Geophysical Prospecting* 39, pp. 1-27.

Watanabe, T., K. T. Nihei, S. Nakagawa, and L. R. Myer, 2004, Viscoacoustic waveform inversion of transmission data for velocity and attenuation, J. Acoust. Soc. Am., 115, 3059-3067.

Wu, H., (1996), "Attenuation structure of Coso geothermal data, California from wave pulse widths," *Bulletin of the Seismological Society of America* 86, pp. 1574-1590.

Zhang, C. (2008), "Seismic Absorption Estimation and Compensation," PhD Thesis, University of British Columbia, pp. 25-27.

\* cited by examiner

Q TOMOGRAPHY METHOD

CROSS-REFERENCE TO RELATED APPLICATION

This application claims the benefit of U.S. Provisional Patent Application 61/331,694, filed May 5, 2010, entitled Q TOMOGRAPHY METHOD, the entirety of which is incorporated by reference herein.

FIELD OF THE INVENTION

The invention relates generally to the field of geophysical prospecting and, more particularly, to seismic data processing. Specifically, the invention relates to the technical field of Q tomography.

BACKGROUND OF THE INVENTION

The seismic attenuation effect needs to be taken into account for characterization of rock properties and proper amplitude-variations-with-offset (AVO) analysis. In migration, seismic attenuation information is needed to compensate for the absorption effect to enhance migration image quality. Therefore, estimation of seismic attenuation is essential for reservoir detection and monitoring.

Seismic attenuation can be quantitatively described by the quality factor Q. A simple assumption is that the seismic attenuation is frequency dependent but the quality factor Q is frequency independent. This assumption is valid in the frequency range of exploration geophysics applications. Q tomography is an approach for Q estimation. This approach attempts to reconstruct subsurface 2D or 3D Q models from seismic data. Generally, Q tomography algorithms are classified into two main categories. One category is ray-based tomography (Quan and Harris, 1997; Plessix, 2006; Rossi et al., 2007). The other category is wave-equation-based tomography (Liao and McMechan, 1996; Hicks and Pratt, 2001, Pratt et al., 2003; Watanabe et al., 2004; Gao et al., 2005). Wave-equation-based tomography is physically more accurate but computationally expensive and not practical for 3D cases. The present invention belongs to the category of ray-based Q tomography.

One major problem with Q tomography is how to establish the link between Q models and seismic data with minimum approximations and with maximum flexibility. A widely used approach is based on the relationship between Q and seismic amplitude decay. Another approach uses the seismic centroid frequency downshift to estimate the quality factor Q. This latter approach is believed to be more robust because this approach is independent of the geometrical spreading effect and reflection/transmission loss. However, the conventional centroid frequency shift method can use only Gaussian, boxcar, or a triangular function to fit the source amplitude spectrum, which introduces significant error because, in most cases, the source spectrum cannot be approximated by these functions. The present invention includes a frequency weighted exponential function, which is designed to fit various asymmetric source amplitude spectra to improve the accuracy of Q tomography by greatly reducing the source amplitude spectrum fitting error.

In most existing Q tomography algorithms, the optimization part is based on unconstrained optimization methods or based on simple nonnegative constrained optimization methods. As a result, these Q tomography algorithms take a large amount of computation time or yield many artifacts and unrealistic Q models (e.g., negative Q values or extremely low Q values), especially when the seismic data are contaminated by noise. The present invention, including an efficient optimization algorithm with box constraints, is able to improve the quality and the reliability of the reconstructed Q models. A more detailed discussion of the prior art follows next.

Seismic attenuation tomography (Q tomography) has been investigated for many years and much progress has been made. The two main components of a ray-based Q tomography algorithm are 1) a simple but accurate relationship between seismic data and Q models for constructing the mathematical model for Q tomography; 2) a reliable and robust optimization algorithm for solving this mathematical problem. Many techniques were developed or proposed for building these two components. These techniques are discussed below.

Establishing Link between Seismic Data and Q Models

The most simple and straightforward method to estimate Q is the spectral ratio method (Spencer et al., 1982; Tonn, 1991), where the logarithm of the spectra ratio between two seismic waveforms is calculated as a function of frequency, and this function is approximated by a linear function of frequency, whose slope is treated as the accumulated seismic attenuation and is eventually related to the Q values along the wave propagation path. Ideally, this method removes the effect of geometrical spreading and reflection/transmission loss with the assumption that these effects are frequency independent. In practical applications, this method is relatively unreliable due to wavelet overlapping, uncertainty in linear fitting, and many other factors.

Rickett (2006) proposed a tomographic extension of the spectral ratio method with the aid of time-frequency analysis technique. This approach was claimed to be insensitive to absolute scaling and was applied in an application of Q profile estimation using a vertical seismic profile (VSP). In this approach, the log-amplitude scalars describing the frequency independent amplitude variation are included in the unknowns, which substantially increases the number of unknowns and reduces the efficiency of the algorithm. Furthermore, in 2D/3D Q tomography using surface seismic reflection data, the log-amplitude scalars are not only a function of position, but also a function of ray, which severely complicates the procedure.

Based on the fact that variation of seismic wavelet rise-time is linearly related to the 1/Q profile along the propagation path, Wu and Lees (1996) reported a seismic attenuation tomography method using the rise-time in earthquake seismology. Unfortunately, this method is impractical in exploration geophysics because the wavelets are inevitably contaminated by noise, scattering effect, overlapping, etc.

It was pointed out that the shape of the seismic wavelet amplitude spectrum is almost exclusively affected by the quality factor Q, and a peak frequency variation method was developed for Q estimation (Zhang, 2008). This method is attractive but, in practice, there are difficulties in accurately measuring peak frequency variation. Moreover, because only the information at an individual frequency is used, the uncertainty of Q estimation can be large.

A more robust method was introduced by Quan and Harris (1997), where the information over the whole frequency band of seismic waveforms is used to calculate the centroid frequency downshift and then relate the centroid frequency shift to the Q profile along the raypath by a simple closed form formulation. This method is intrinsically immune to geometrical spreading and reflection/transmission loss. The limitation of this method is that the source amplitude spectrum has to be a Gaussian, boxcar, or triangular function. It is well known that the seismic amplitude spectrum is never a boxcar or triangular function. Also, it is usually asymmetric and can be very different from a Gaussian function. If this asymmetric amplitude spectrum is approximated by a Gaussian function, significant errors will be introduced in the reconstruction of Q models. Therefore, if there is a function that can be used to fit various seismic frequency spectra more accurately without losing the simple nature of the relation between the centroid by frequency of the recorded seismic data and the Q profile along the raypath, this robust method can be more accurate in practical Q tomography applications.

Constrained Optimization Algorithms for Q Tomography

When the relation between seismic data and Q models is established, the ray-based Q tomography problem can be described by a linear optimization problem. In most existing Q tomography algorithms, this linear optimization problem is solved iteratively by using Krylov subspace methods, such as the conjugate gradient method and the LSQR method without applying any constraints (Quan and Harris, 1997; Plessix 2006, Rossi et al, 2007). These algorithms work well provided that the seismic data have high signal-to-noise ratio (SNR). However, seismic data are never clean; in handling real field data, these unconstrained optimization algorithms always result in some negative Q values or extremely small positive Q values, which are physically unreal. Furthermore, under some circumstances, a priori information of the range of Q values is known. In these cases, this information needs to be included in the tomography algorithm through a box constraint to provide more reliable Q tomography results.

Rickett (2006) developed a Q estimation algorithm with a constraint. But his algorithm adopts a nonnegative constraint instead of a box constraint, which means, negative Q values are eliminated but extremely low positive Q values can still exist. Rickett (2006) reported two methods to apply the nonnegative constraint. The first method is a nonlinear transformation method. In this nonlinear transformation method, the variable Q is replaced by $e^y$ and y is solved for instead of 1/Q. By doing this, Q is forced to be positive but the whole system can be very nonlinear. To achieve this goal, the resulting optimization system is solved with a Gauss-Newton approach, which can be very expensive. Another disadvantage of this method is that, during optimization, when the Q values are very large, the gradient-based optimization algorithm will be stagnant or converge very slowly, i.e., the Q values will stay there and no longer change. In the worst case, if the y values in the starting model are infinite, then the gradient of the cost function is 0 and the optimization algorithm does not perform searching. The second method of applying the nonnegative constraint reported by Rickett (2006) is the enforcement of the monotonically increasing property of attenuation by a smoothing technique. This method works effectively for Q estimation using VSP data but may fail in 2D Q tomography using surface reflection seismic data.

The present inventors know of no existing Q tomography algorithm with box constraints to enforce the estimated Q values within the ranges specified by the upper boundaries and the lower boundaries. However, optimization algorithms with box constraints are employed in some other geophysical applications, such as velocity tomography. For example, Delbos et al. (2006) developed a seismic reflection tomography algorithm with box constraints. In their algorithm, the constrained optimization problem is solved with a Gauss-Newton augmented Lagrangian approach and the associated Lagrange problem, another constrained optimization problem, is solved by a combination of the gradient projection method, the active-set method, and the conjugate gradient method. The active-set method they use is conventional, and it is inefficient because the algorithm updates the active set, one constraint at a time (Bierlaire et al., 1991). When the number of box constraints is huge, the convergence rate of the algorithm can be very slow.

In the present invention, a recent development in the mathematical field, which may be referred to as the multi-index active-set method (Morigi et al., 2007), is employed to perform the Q tomography with box constraints, which significantly improves the performance of the Q tomography algorithm in terms of Q reconstruction quality and algorithm efficiency compared with the unconstrained Q tomography algorithm and the constrained algorithm using the conventional active-set method.

SUMMARY OF THE INVENTION

In one embodiment, the invention is a ray-based, centroid frequency shift Q tomography method for reconstructing subsurface depth models for 1/Q from seismic data measured by receivers in a survey using a seismic source, comprising selecting a mathematical function to approximate the seismic source's amplitude spectrum in order to calculate the spectrum's centroid frequency shift due to earth attenuation, and relating said centroid frequency shift to attenuation as represented by the reciprocal of quality factor Q, and solving for Q or 1/Q by iterative, linear optimization, wherein the optimization has box constraints to keep estimated Q values within position-dependent ranges specified by upper boundaries and lower boundaries. The constrained optimization may be solved by a multi-index active-set method that allows updates of the active set by multiple grid indices at a time, wherein a grid index denotes subsurface location. The selected mathematical function may be a frequency-weighted exponential function of frequency. Use of this function to approximate the seismic source's amplitude spectrum will be advantageous whether or not box constraints are used in the optimization.

The reconstructed subsurface Q model produced by the present inventive method may be advantageously used, among other things, in seismic imaging to compensate for the amplitude dimming, frequency loss, and phase distortion effect caused by the viscoacoustic overburden, such as a gas reservoir. By including the more accurate Q model provided by the present invention in seismic imaging procedure, the quality of the geological structure image can be improved significantly. In addition, the reconstructed Q model will be beneficial in reservoir characterization applications because Q is very sensitive to some rock and fluid properties such as fluid saturation and porosity. In such applications, the invention becomes a method for hydrocarbon exploration, development or production.

The person skilled in the art of Q tomography will recognize that at least some of the steps of the present inventive method are preferably performed on a computer, programmed in accordance with the teachings herein, i.e., the invention is computer implemented in most or all practical applications.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present invention and its advantages will be better understood by referring to the following detailed description and the attached drawings in which.

Figure 3:
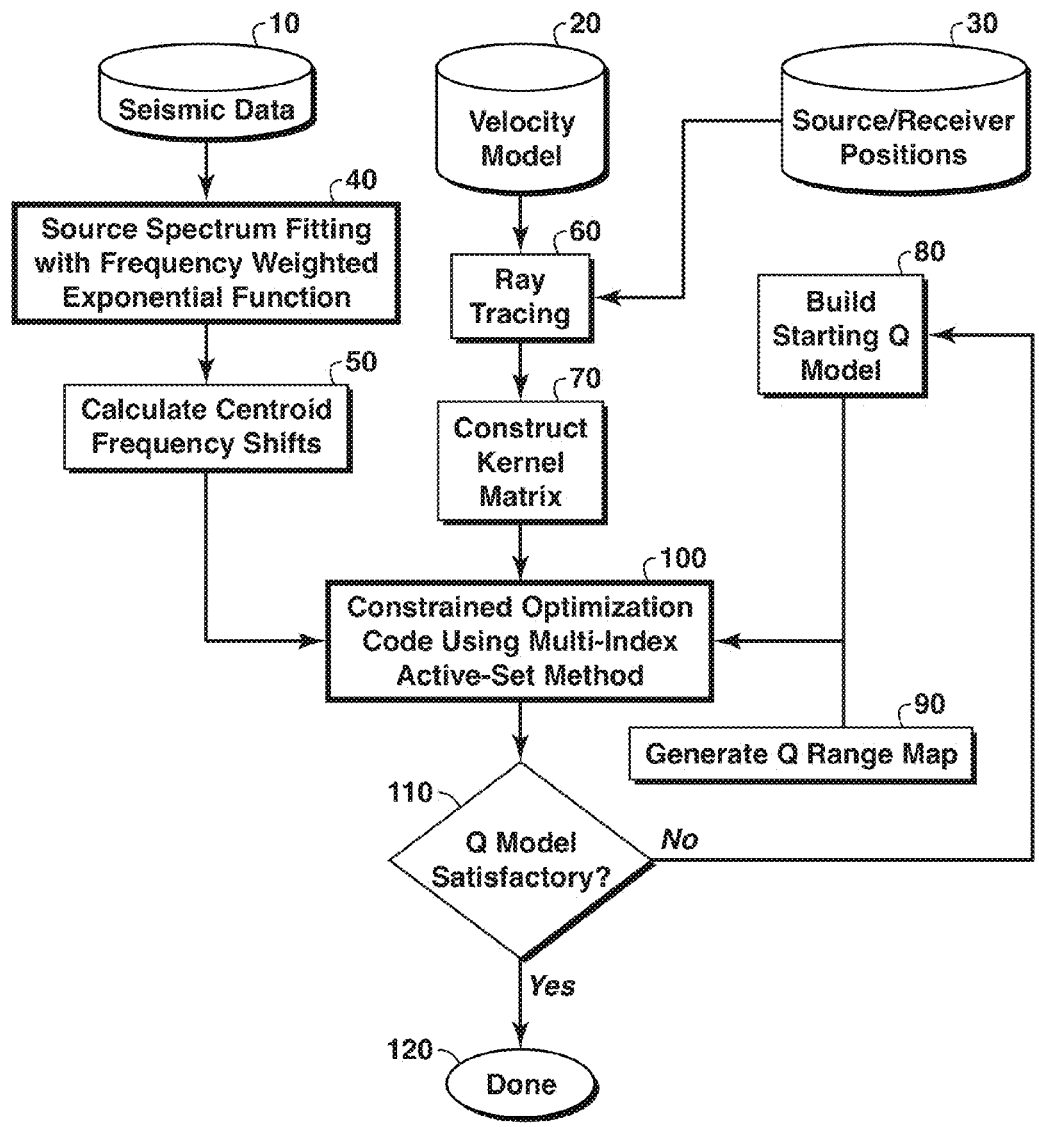

with n=1, 2, 3, 4, and 5 while the centroid frequency $(n+1)f_0$ is fixed at 30 Hz;

FIG. 3 is a flowchart showing basic steps for implementing the present invention in Q tomography;

FIGS. 4 to 8A-B pertain to the synthetic example application, where

Figure 4:
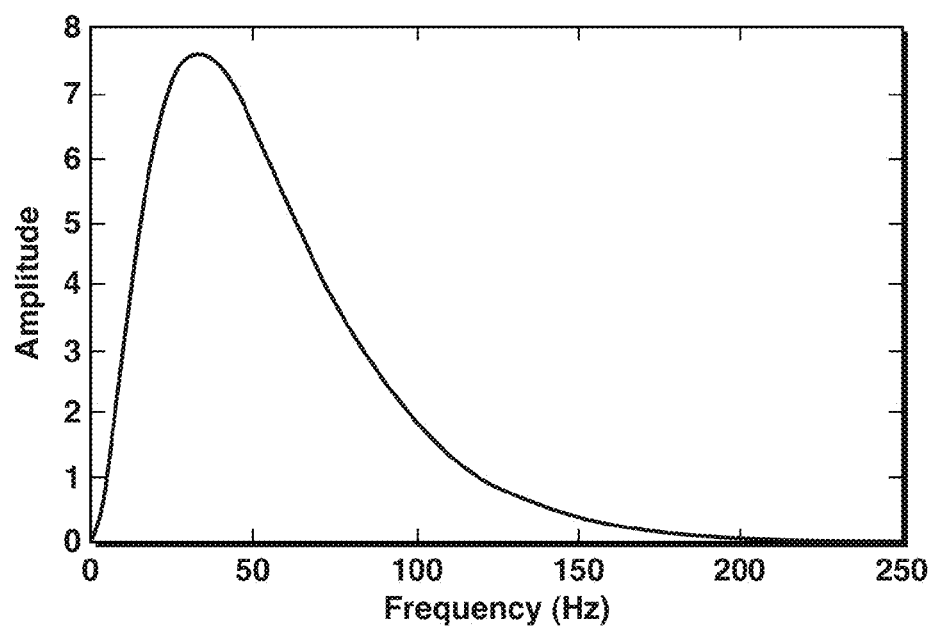
Figure 5A:
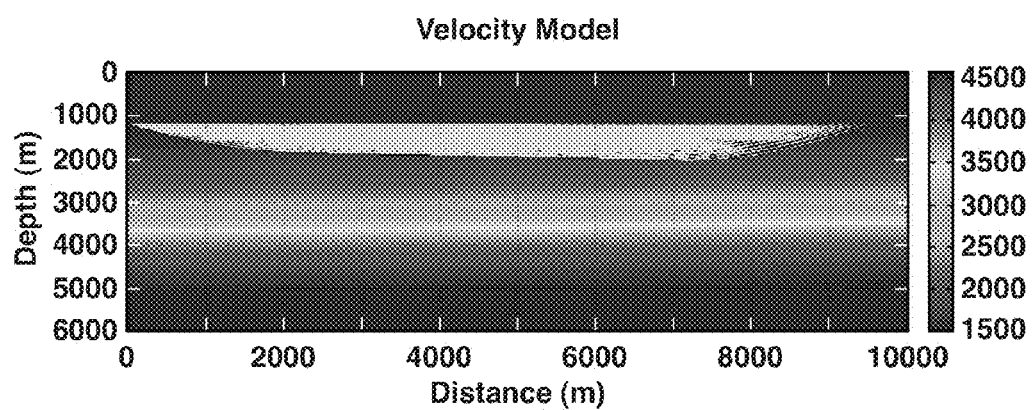
Figure 5B:
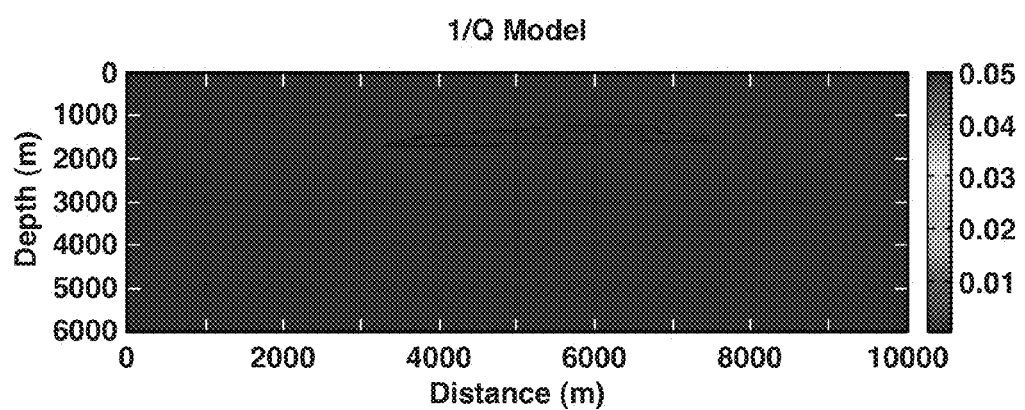
Figure 6A:
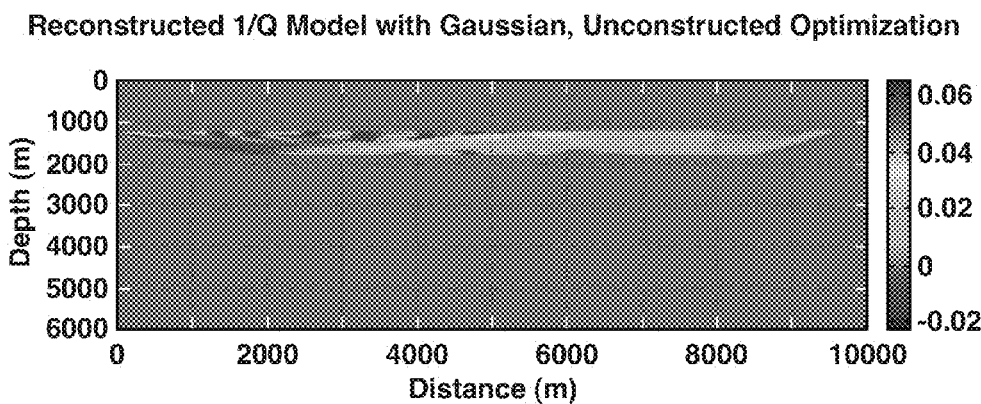
Figure 6B:
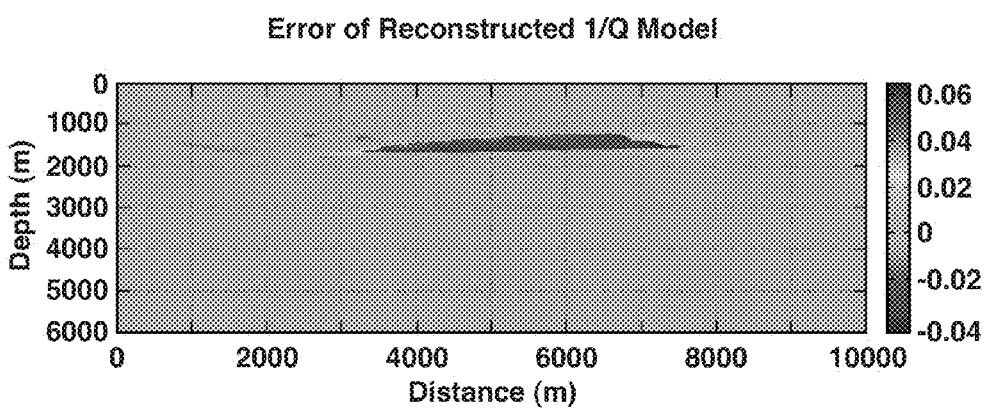
Figure 7A:
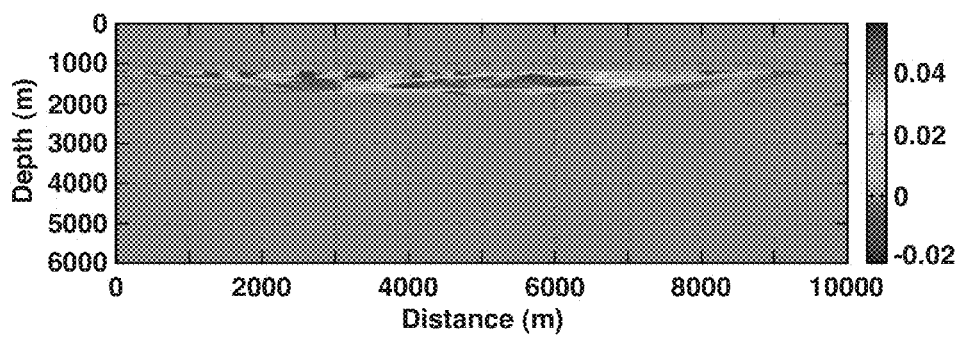
Figure 7B:
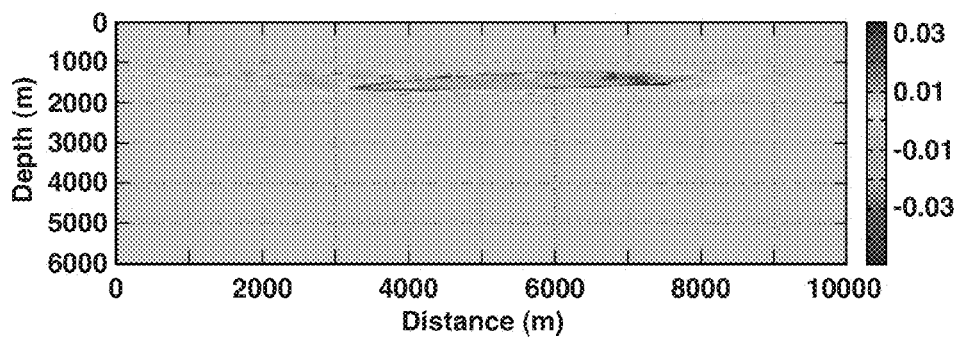
Figure 8A:
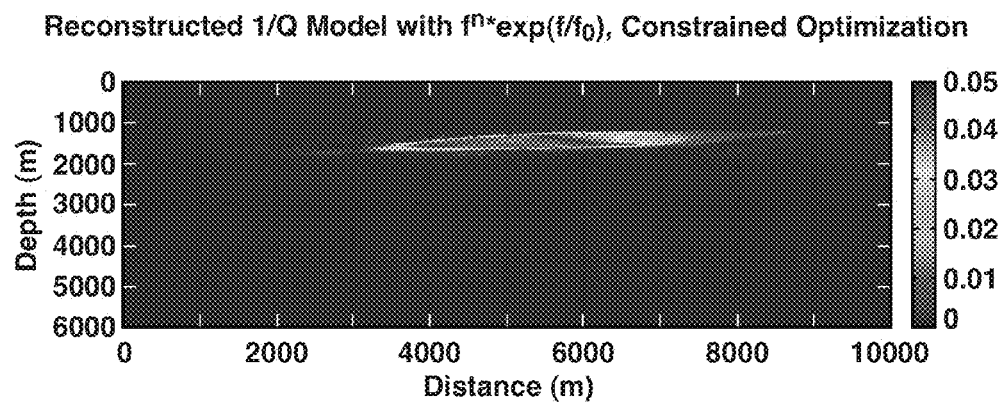
Figure 8B:
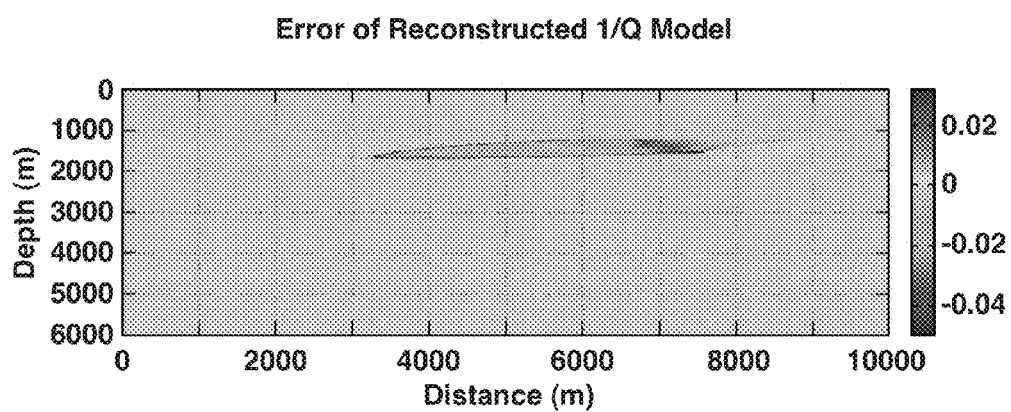

FIG. 4 is the source amplitude spectrum;

FIGS. 5A-B show the velocity model and the raypaths (5A) and the true 1/Q model (5B);

FIG. 6A shows the reconstructed 1/Q model using the conventional centroid frequency shift Q tomography method with Gaussian function fitting and without box constraints; and FIG. 6B shows the difference between the reconstructed 1/Q model of FIG. 6A and the true 1/Q model of FIG. 5B;

FIG. 7A shows the reconstructed 1/Q model using the centroid frequency shift Q tomography method with the frequency weighted exponential function fitting of the present invention but without box constraints; FIG. 7B shows the difference between the reconstructed 1/Q model of FIG. 7A and the true 1/Q model of FIG. 5B; and FIG. 8A shows the reconstructed 1/Q model using the centroid frequency shift Q tomography method with the present invention's frequency weighted exponential function fitting and with box constraints according to the present invention; FIG. 8B shows the difference between the reconstructed 1/Q model of FIG. 8A and the true 1/Q model of FIG. 5B.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

The present invention includes a method for reconstruction of 2D or 3D seismic quality factor (Q) models from seismic data, a technical field known as Q tomography.

The main features of the present invention in at least some embodiments are as follows. The source wavelet amplitude spectrum is analyzed and fitted by a specially designed function, the frequency weighted exponential function. The source wavelet amplitude spectrum fitting is implemented by adjusting two parameters of the frequency weighted exponential function. The shifts of the centroid frequencies of the received seismic waveforms with respect to the source wavelet centroid frequency are calculated and input to the optimization algorithm with box constraints to reconstruct the Q model, where the ranges of the Q values are predetermined by a priori information. Unlike the original centroid frequency shift method (Quan and Harris, 1997), with the specially designed amplitude spectrum fitting function, this Q tomography algorithm is able to handle non-Gaussian and asymmetric source amplitude spectra to reduce the error introduced by the mismatch in the source amplitude spectrum fitting. With this specially designed source spectrum fitting function, the Q tomography problem is cast as a constrained optimization problem with box constraints. This constrained optimization is solved by employing the multi-index active-set method (Morigi et al., 2007), which further improves the accuracy and the robustness of this Q tomography algorithm without sacrificing the high efficiency feature. The term active set refers to that subset of the set of unknowns being optimized that cannot be updated at the end of an iteration cycle as would be indicated because they are bumping up against a constraint, either an upper limit or a lower limit.

Some underlying theory of the invention is explained next.

If the amplitude spectrum of the source wavelet is S(f), then the amplitude spectrum of the received seismic waveform R(f) can be expressed as (Quan and Harris, 1997)

$$R(f)=GH(f)S(f), \quad (1)$$

where G is a frequency independent factor including the effects of geometrical spreading, reflection/transmission coefficients, etc. H(f) is an impulse response function describing the seismic attenuation effect, which is formulated as $$H(f) = \exp\left(-f \int_{ray} \frac{\pi}{Qv} dl\right), \quad (2)$$

where Q is the quality factor and v is the seismic (i.e., acoustic) wave velocity.

In the centroid frequency shift method for Q estimation, a key part is to use an analytical function to fit the source amplitude spectrum S(f) and then derive the explicit relation between the centroid frequency of the received seismic waveform and the Q profile along the wave propagation path. In the original centroid frequency shift method, this explicit relation can be derived only with the assumption that the source amplitude spectrum is a Gaussian function or a boxcar function (a function that is zero over the entire real line except for a single interval where it is equal to a constant) or a triangular function. This is the main disadvantage of the traditional centroid frequency shift method, which can lead to large errors in Q estimation (Rickett, 2006).

One of the main features of at least some embodiments of the invention is that a frequency weighted exponential function is designed to fit various asymmetric source amplitude spectra more accurately without losing the simple closed form relationship between the centroid frequency shift and the Q profile along the raypath. Furthermore, it is very convenient to implement the source amplitude spectrum fitting using this specially designed function because the shape and the bandwidth of the function are determined by two parameters separately. The formulation of the frequency weighted exponential function is $$F(f) = Af^n \exp\left(-\frac{f}{f_0}\right), \quad (3)$$

where A is a constant for amplitude scaling, $f_0$ is called characteristic frequency, and n is called symmetry index. The characteristic $f_0$ is a parameter for bandwidth controlling. If the symmetry index n is fixed, the bandwidth of this function expands with the increase of the characteristic frequency. Actually, the centroid frequency of F(f) has a very simple form, as given below:

$$f_F = \frac{\int_0^{+\infty} fF(f)df}{\int_0^{+\infty} F(f)df} = (n+1)f_0. \tag{4}$$

Figure 1:
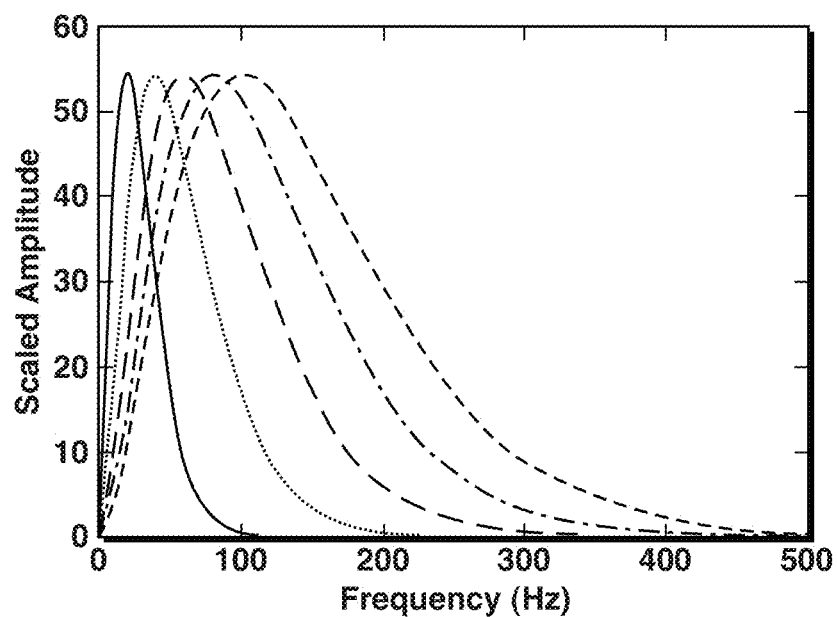
FIG. 1 shows the bandwidth variation of a frequency weighted exponential function designed to fit various asymmetric source amplitude spectra in at least some embodiments of the invention, for various values of a characteristic frequency parameter and a selected value of n=2 for a second parameter called symmetry index.
Figure 2:
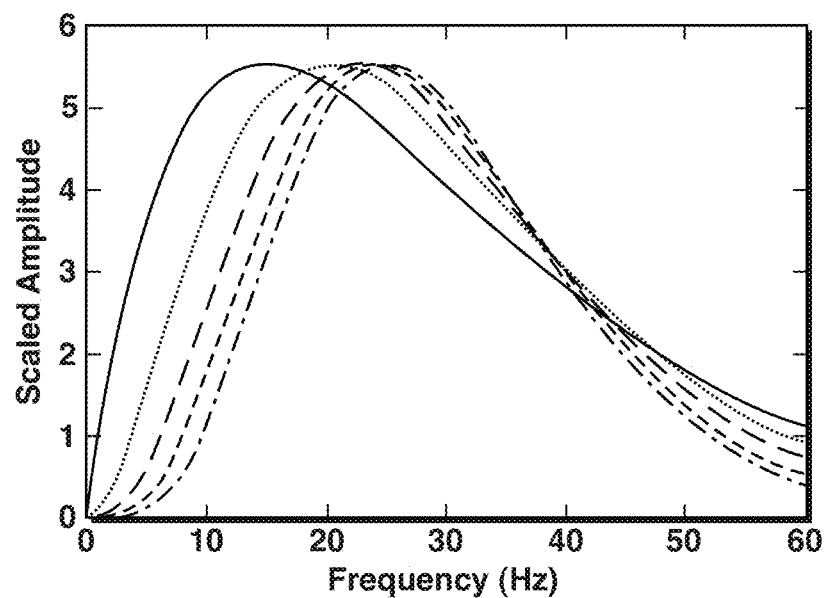
FIG. 2 shows plots of the frequency weighted exponential function $$F(f) = Af^n \exp\left(-\frac{f}{f_0}\right)$$

FIG. 1 shows the bandwidth variation of F(f) when n=2 with five different characteristic frequencies ranging from 10 Hz to 50 Hz in increments of 10 Hz. In FIG. 1, when $f_0$ varies from 50 Hz to 10 Hz, the shape of F(f) remains relatively unchanged while the bandwidth is shrinking as expected. On the other hand, the symmetry index n is used to control the symmetry property of F(f). The larger the symmetry index n, the more symmetrical the shape of the function F(f) as shown in FIG. 2, where the centroid frequency is fixed as 30 Hz while the symmetry index n varies from 1 (least symmetric) to 5 (most symmetric). It is not necessary for n to be an integer. For accurate fitting purpose, theoretically, n can be any real number. However, in practice, usually n should not exceed 5. As mentioned earlier, since the centroid frequency and the symmetry property of this specially designed function are controlled separately by two different parameters, it is very easy for users to accurately fit various asymmetric source amplitude spectra with this function.

According to ray theory, i.e., substituting Eqs. (2) and (3) into Eqn. (1), if the source amplitude spectrum is approximated by the frequency weighted exponential function, i.e., S(f)=F(f), then the amplitude spectrum of the received seismic waveform can be written in the form $$R(f) = GH(f)S(f) = AGf^n \exp\left[-f\left(\int_{ray} \frac{\pi}{Qv} dl + \frac{1}{f_0}\right)\right]. \tag{5}$$

The centroid frequency of the received seismic waveform can be calculated as $$f_R = \frac{\int_0^{+\infty} fR(f)df}{\int_0^{+\infty} R(f)df} = \frac{n+1}{\int_{ray} \frac{\pi}{Qv} dl + \frac{1}{f_0}}. \tag{6}$$

Since the centroid frequency of the source amplitude spectrum $f_s$ is $(n+1)f_0$, the centroid frequency shift between the source amplitude spectrum and the received signal amplitude spectrum can easily be obtained as $$\Delta f = f_S - f_R = (n+1)\left(f_0 - \frac{1}{\int_{ray} \frac{\pi}{Qv} dl + \frac{1}{f_0}}\right). \tag{7}$$

The accumulated attenuation along the ray path $$\int_{ray} \frac{\pi}{Qv} dl$$

can now be derived from the centroid frequency shift by solving equation (7):

$$\int_{ray} \frac{\pi}{Qv} dl = \frac{\Delta f}{f_0[(n+1)f_0 - \Delta f]} \tag{8}$$

$$= \frac{\Delta f}{f_0(f_S - \Delta f)}$$

$$= \frac{\Delta f}{f_0 f_R}$$

$$= \frac{(n+1)\Delta f}{f_S f_R}.$$

Equation (8) indicates that 1/Q is linked to the centroid frequency shift through a very simple linear relationship with the frequency weighted exponential function.

The discrete form of equation (8) for $i^{th}$ measurement ($i^{th}$ ray) is $$\sum_j \frac{\pi l_j^i}{Q_j v_j} = \frac{\Delta f^i}{f_0 f_R^i}, \tag{9}$$

where the superscript i is the measurement index and the subscript j is the grid index and $l_j^i$ is the ray length in the $j^{th}$ grid for the $i^{th}$ measurement.

After collecting all the measurements, equation (9) can be written in a matrix form $$Ax=d. \tag{10}$$

In equation (10), A is the kernel matrix whose entries are defined by $$A_{ij} = \frac{\pi l_j^i}{v_j}, \tag{11}$$

x is the vector of unknowns, i.e., $$x_j = 1/Q_j, \tag{12}$$

and d is the measurement vector defined by $$d_i = \frac{\Delta f^i}{f_0 f_R^i}. \tag{13}$$

The remaining task is to solve equation (10) for Q. Since the measured data are inevitably contaminated by noise, the linear system of equation (10) is ill-conditioned and has non-unique solutions. Therefore, this system may be treated as a least square problem, and one solves for the approximate solution of the quadratic programming problem $$\min \|Ax-d\|. \tag{14}$$

where $\| \ldots \|$ denotes the Eculidean vector.

As discussed earlier, in order to eliminate the unrealistic negative Q values and incorporate a priori information of the ranges of the Q values in regions of interest, problem (14) may be converted to a minimization problem with box constraints $$\min \|Ax-d\| \text{ subject to } 1 < x < u, \tag{15}$$

where l and u are the vectors storing the lower boundaries and the upper boundaries of the Q values. A preferred type of algorithm that may be employed to solve the optimization problem (15) is a multi-index active-set method such as was disclosed by Morigi et al. (2007). The 2007 paper by Morigi et al. is incorporated herein in its entirety in those patent jurisdictions that allow it. Compared with other constrained tomography algorithms (Rickett, 2006, Delbos et al., 2006), this algorithm is able to handle box constraints more efficiently and more effectively. A key feature of this new type active-set method is that it allows updates of the active set by multiple indices at a time.

A two-level structured procedure of this constrained optimization algorithm may be described as follows.

1. Initialization: given an initial model $x^0$ and an error tolerance $\epsilon$, iteratively solve the unconstrained optimization problem $$\|Ax-d\| \leq \epsilon \quad (16)$$

to obtain the unconstrained solution $\hat{x}^1$, where $\|\ldots\|$ denotes the Euclidean vector norm, i.e., $\|x\|=\sqrt{(x_1^2+x_2^2+\ldots+x_n^2)}$.

2. Start the $k^{th}$ outer iteration, beginning with k=1: orthogonally project $\hat{x}^k$ onto the feasible vector set to get the approximate constrained solution at the first outer iteration $x^k$. The orthogonal projection is denoted by $$x_i^k = \begin{cases} l_i & \hat{x}_i^k < l_i \\ u_i & \hat{x}_i^k > u_i \\ \hat{x}_i^k & l_i \leq \hat{x}_i^k \leq u_i, \end{cases} \quad (17)$$

where the superscript is the outer iteration index and the subscript is the grid index. Those $x_i^k$ that satisfy either of the first two conditions of equation (17) are called the active set of variables for the current iteration, or their indices are called the active set of indices. That is, they are the variables (indices) that are impacted by one or the other of the box constraints.

3. Evaluate the residual $r^k = Ax^k - d$. If $\|r^k\| \leq \epsilon$, then the constrained approximate solution $x^k$ satisfies the stopping criterion. Terminate the iteration and $x^k$ is the final solution. If not, proceed to step 4.

4. Calculate the Lagrange multipliers $\lambda^k = A^T(Ax^k - d)$ and update the active set by designing the diagonal matrix $C^k$ whose diagonal entries $c_{ii}^k$ are defined by $$c_{ii}^k = \begin{cases} 0 & x_i^k = l_i, \lambda_i^k > 0 \\ 0 & x_i^k = u_i, \lambda_i^k < 0 \\ 1 & \text{otherwise.} \end{cases} \quad (18)$$

5. Iteratively (this is the inner iteration) solve the following unconstrained minimization problem by using the conjugate gradient method to obtain the adjustment vector $y^k$.

$$\|B^k y^k + r^k\| \leq \epsilon, \quad (19)$$

where $B^k = AC^k$.

6. Adjust the solution $x^k$ to obtain the unconstrained solution $\hat{x}^{k+1}$ for the next outer iteration by $$\hat{x}^{k+1} = x^k + C^k y^k. \quad (20)$$

Then, go to step 2 and enter the next outer iteration.

Some or all (typically, all) six steps in the above method will be performed in practical applications of the invention using a computer.

The above algorithm differs from conventional active-set type methods (Bierlaire et al., 1991) in the following two respects: the present inventive method lets step 1 and step 5 run until the optimality conditions (16) and (19) are satisfied; and then in step 4 the active set's population is updated by removing or adding one or more (grid) indices according to whether an $\hat{x}_i^k$ from the previous unconstrained inner loop iteration satisfies one of the two conditions $$\hat{x}_i^k < l_i$$

$$\hat{x}_i^k > u_i.$$

In contrast, in the conventional active-set methods, only one index in the active set is updated at a time. In other words, the conventional active-set methods update the active set as soon as the approximate solution hits the upper or lower boundaries, but the present inventive method does not update the active set until algorithm converges to the error tolerance. The conventional active-set algorithm ensures that the residual is monotonically decreasing; in practical applications, it shows very slow convergence rate because it frequently degenerates to a restarted steepest descent method, especially when the matrix is highly ill-conditioned. This new type of active-set algorithm is not guaranteed to give a monotonically decreasing data misfit. However, experience shows that if the error tolerance is chosen appropriately, this algorithm performs very well in terms of fast convergence rate and results in a feasible solution satisfying the error tolerance.

Another advantage of the present invention's active-set type algorithm, as exemplified by steps 1-6 above, is that the starting Q model used to launch the optimization can be arbitrary, which means the starting Q model can be set on the upper or lower boundary or even outside of the bound. This feature can be very useful under some circumstances.

The present invention can be implemented according to the flow chart shown in FIG. 3. As in conventional ray-based tomography algorithms, in step 60, the velocity model 20 and the source/receiver positions 30 are input into the ray tracing code to output the ray path information, which is used to construct the kernel matrix (A in Eqs. 10 and 11) in step 70. In step 40, the seismic data are analyzed and the source amplitude spectrum is approximated by the frequency weighted exponential function (Eqn. 3), during which the symmetry index n and the characteristic frequency $f_0$ are determined. Then the centroid frequencies of all the seismic traces are calculated to obtain the centroid frequency shifts (Eqn. 7) in step 50. In step 80 and step 90, the a priori information is collected to build a starting Q model and a Q range map. After that, in step 100, the centroid frequency shifts of all the seismic trances, the kernel matrix, the starting Q model, and the Q range map are input to the multi-index active-set constrained optimization code (the 6-step algorithm above) to perform the Q model reconstruction. The reconstructed Q model is judged by the user in step 110. If the reconstructed Q model is accepted, the Q tomography process finishes. Otherwise, users rebuild the starting Q model and/or the Q range map and implement the constrained optimization again until the reconstructed Q model is satisfactory. Parenthetical inserts above refer to example embodiments of the invention. The description herein concentrates on steps 40 and 100, which are the main points of invention. Except where noted, the other steps shown in FIG. 3 are well known in the field of Q tomography, and for the purposes of this invention may be performed in any known or later developed way. Moreover, while it is preferred to implement both the present invention's improvements to step 40 and its improvements to step 100, one may be implemented without the other, i.e. a standard approach may be used to fulfill the function of step 40 or step 100.

Various optional steps or refinements may be added to the basic steps shown in FIG. 3. For example:

1) All the seismic traces may be preprocessed before step 40: The first arrivals are windowed and isolated, the amplitude spectra of the isolated wavelets are calculated, and the polynomial fitting is implemented on the amplitude spectra. (Often raw seismic data are very noisy. Therefore, rather than attempt to fit the raw seismic amplitude spectrum using a Gaussian function, the first step in practice may be a polynomial fitting of the raw seismic amplitude spectrum to convert it to a smooth curve. This same intermediate step may be useful in applying the present inventive method, after which it may be easier to fit the smooth polynomial curve with the frequency weighted exponential function.)
2) A regularization matrix may be added to stabilize the optimization process of step 100.
3) The starting Q model may be built (step 80) from one or more velocity anomalies.
4) When the number of seismic traces is too small, data regularization techniques may be employed.
5) During step 100, the inner iteration of the constrained optimization algorithm may be implemented by using the conjugate gradient method or the LSQR method (a variation of the conjugate gradient method; see Paige and Saunders, 1982).
6) During step 40, if the source spectrum is unavailable, it may be estimated from the received seismic waveforms whose associated rays do not penetrate regions with possible Q anomalies.

EXAMPLES

In this section, a synthetic example of Q tomography is presented. The performance of the Q tomography algorithm of the present invention is compared with that of the conventional centroid frequency shift Q tomography algorithms using the Gaussian function with or without the box constraints. FIG. 4 shows the source amplitude spectrum, which is asymmetric. The centroid frequency of the source amplitude spectrum can be calculated numerically as 55.7 Hz and the peak frequency is 33 Hz. With the Gaussian function source amplitude spectrum fitting, the peak frequency of the Gaussian function is 55.7 Hz and the variance is 1246 Hz$^2$. With the frequency weighted exponential function fitting, the parameters n and $f_0$ in equation (3) are 1.45 and 22.7 Hz respectively. FIG. 5A is the velocity model and the raypaths obtained by running the ray tracing code, while FIG. 5B is the true 1/Q model. In this synthetic data testing, 50 sources are used. For each source, there are 90 receivers. Therefore, in total there are 4500 traces.

FIG. 6A is the reconstructed 1/Q model using the conventional centroid frequency shift Q tomography method with the Gaussian function fitting and the unconstrained optimization is used. Consequently, the reconstructed 1/Q model significantly deviates from the true 1/Q model due to the large error introduced by the Gaussian source amplitude spectrum fitting. FIG. 6B shows the difference between the reconstructed 1/Q model and the true 1/Q model. Then, the Gaussian function is replaced by the frequency weighted exponential function of the present invention to fit the source amplitude spectrum and the reconstructed 1/Q model with the unconstrained optimization algorithm is shown in FIG. 7A. The result is greatly improved compared with that obtained using the Gaussian fitting. However, there are many artifacts in the reconstructed 1/Q model and the Q values in some regions are negative, which is physically unreal. Again, FIG. 7B is the difference between the reconstructed 1/Q model and the true 1/Q model. FIG. 8A shows the Q tomography result using the present invention's frequency weighted exponential function fitting, this time also using the present invention's optimization algorithm with box constraints, which enforces the reconstructed 1/Q values to be within the range between 0 and 0.05. FIG. 8B is the difference between the reconstructed 1/Q model and the true 1/Q model. This result is better than the previous two because there is no negative Q value in the result and fewer artifacts are in present.

In some embodiments of the invention, estimating the source's amplitude spectrum is performed by calculating an averaged amplitude spectrum of seismic traces that do not penetrate subsurface regions showing Q anomalies. Smoothing may be applied to the averaged amplitude spectrum, which may be done using a polynomial fitting technique.

In some embodiments of the invention, the received signal amplitude spectrum may be computed from the first arrivals of the seismic data traces, which may be isolated by windowing.

In some embodiments of the invention, the starting 1/Q model may be built from the subsurface acoustic velocity model. The starting 1/Q model may be built from one or more anomalies in the subsurface acoustic velocity model through a linear mapping.

In some embodiments of the invention, the 1/Q range map may have lower boundaries that are all >0.

The foregoing description is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined by the appended claims.

References

Bierlaire, M., Ph. L. Toint, and D. Tuyttens, "On iterative algorithms for linear least squares problems with bound constraints," *Linear Algebra Appl* 143, 111-143 (1991).

Delbos, D., J. Ch. Gilbert, R. Glowinski, and D. Sinoquet, "Constrained optimization in seismic reflection tomography: a Gauss-Newton augmented Lagrangian approach," *Geophysics* 164, 670-684 (2006).

Gao, F., G. Fradelizio, A. Levander, G. Pratt, and C. Zelt, "Seismic velocity, Q, geological structure and lithology estimation at a ground water contamination site," 75th SEG, Expanded Abstracts, 1561-1564, Soc. of Expl. Geophys (2005).

Hicks, G. J. and R. G. Pratt, "Reflection waveform inversion using local descent methods: Estimating attenuation and velocity over a gas-sand deposit," *Geophysics* 66, 598-612 (2001).

Liao, Q. and G. A. McMechan, "Multifrequency viscoacoustic modeling and inversion," *Geophysics* 61, No. 5,1371-1378 (1996).

Lötstedt, P., "Solving the minimal least squares problem subject to bounds on the variables," *BIT* 24 (1984).

Morigi, S., L. Reichel, F. Sgallari, and F. Zama, "An iterative method for linear discrete ill-posed problems with box constraints," *Journal of Computational and Applied Mathematics* 198, 505-520 (2007).

Nocedal, J. and S. J. Wright, *Numerical Optimization*, Springer, New York (1999).

Paige, C. C. and M. A. Saunders, "LSQR: An algorithm for sparse linear equations and sparse least squares," *ACM Trans. Math. Software* 8, 43-71 (1982).

Plessix, R.-E., "Estimation of velocity and attenuation coefficient maps from crosswell seismic data," *Geophysics* 71, S235-S240 (2006).

Pratt, R. G., K. Bauer, and M. Weber, "Crosshole waveform tomography velocity and attenuation images of arctic gas hydrates," 73rd SEG, Expanded Abstracts, Society of Exploration Geophysics, 2255-2258 (2003).

Rickett, J. E., "Method for estimation of interval seismic quality factor," U.S. Pat. No. 7,376,517 (2006).

Rossi, G., D. Gei, G. Böhm, G. Madrussani, and J. M. Carcione, "Attenuation tomography: An application to gas-hydrate and free-gas detection," *Geophysics* 55, 655-669 (2007).

Spencer, T. W., J. R. Sonnad, and T. M. Butler, "Seismic Q-stratigraphy or dissipation," *Geophysics* 47, 16-24 (1982).

Tonn, R., "The determination of the seismic quality factor Q from VSP data: A comparison of different computational method," *Geophysical Prospecting* 39, 1-27 (1991).

Quan, Y. and J. M. Harris, "Seismic attenuation tomography using the frequency shift method," *Geophysics* 62, 895-905 (1997).

Watanabe, T., K. T. Nihei, S. Nakagawa, and L. R. Myer, "Viscoacoustic waveform inversion of transmission data for velocity and attenuation," *J. Acoust. Soc. Am.* 115, 3059-3067 (2004).

Wright, S. J., "Primal-Dual Interior Point Methods," SIAM (1997).

Wu, H., and J. M. Lees, "Attenuation structure of Coso geothermal data, California from wave pulse widths," *Bulletin of the Seismological Society of America* 86, 1574-1590 (1996).

Zhang, C., "Seismic Absorption Estimation and Compensation," PhD thesis, University of British Columbia (2008).

The invention claimed is:

1. A ray-based, centroid frequency shift Q tomography method for reconstructing a subsurface Q model from seismic data measured by receivers in a survey using a seismic source, comprising:

selecting a mathematical function to approximate the seismic source's amplitude spectrum, and using this to calculate the spectrum's centroid frequency shift due to earth attenuation, and relating said centroid frequency shift to attenuation by a line integral along a ray path connecting the seismic source to a receiver, said attenuation being represented by the reciprocal of quality factor Q, and solving for Q or 1/Q by iterative, linear optimization using a computer, wherein the optimization has box constraints to keep estimated Q values between an upper limit and a lower limit, which limits may be constant or may vary with position.

2. The method of claim 1, wherein the box-constrained optimization is solved by a multi-index active-set method that allows updates of the active set by multiple grid indices at a time, wherein a grid index denotes subsurface location.

3. The method of claim 1, wherein the selected mathematical function is a frequency-weighted exponential function of frequency.

4. The method of claim 3, wherein the frequency-weighted exponential function of frequency has two parameters that are adjusted to provide a fit to the seismic source's amplitude spectrum.

5. The method of claim 4, wherein the two parameters are a characteristic frequency for bandwidth controlling and a symmetry index, each being a positive real number.

6. The method of claim 5, wherein the frequency-weighted exponential function of frequency can be expressed in the form $$F(f) = Af^n \exp\left(-\frac{f}{f_0}\right)$$

where f is frequency, A is a constant for amplitude scaling, and $f_0$ is the characteristic frequency, and n is the symmetry index.

7. The method of claim 1, further comprising:

(a) estimating the source's amplitude spectrum and calculating its centroid frequency;

(b) approximating the source's amplitude spectrum by a frequency weighted exponential function of frequency;

(c) calculating the amplitude spectra of first arrivals of traces of the seismic data;

(d) calculating centroid frequency shifts, being differences between centroid frequencies of the amplitude spectra calculated in (c) and the calculated centroid frequency of the source's amplitude spectrum;

(e) building a measurement vector d in terms of the centroid frequency shifts and the centroid frequencies of the amplitude spectra calculated in (c);

(f) running a ray tracing code on a computer using a subsurface acoustic velocity model and source-receiver information from the survey;

(g) building a kernel matrix A in terms of ray segment lengths and corresponding acoustic velocities;

(h) building a starting Q model of the subsurface from available information, said starting model specifying a value of 1/Q for each cell in the starting model;

(i) generating a 1/Q range map providing box constraints for 1/Q throughout the model, said box constraints based on available information;

(j) performing iterative optimization, wherein a computer solves the problem min$\|Ax-d\|$ for components of a vector x, subject to the box constraints, where $x_j=1/Q_j$, index j denoting a $j^{th}$ cell in the model, thereby reconstructing a volume of 1/Q values as a function of depth and lateral position in the subsurface.

8. The method of claim 7, wherein the iterative optimization subject to box constraints is performed by employing a type of active-set method that updates multiple indices of the active sets during the optimization.

9. The method of claim 8, wherein the iterative optimization has an outer iterative loop and an inner iterative loop, and the inner iterative loop performs an unconstrained optimization that determines adjustments to $x_i$ to minimize $\|Ax-d\|$.

10. The method of claim 9, wherein after each inner loop iteration yields an $x_i$ for each model cell i, the next outer loop begins by testing the $x_i$ against the box constraints and constraining those $x_i$ that violate the constraints, said constrained $x_i$ being called the active set, then testing for whether $\|Ax-d\|<\epsilon$, and if not, proceeding to the next inner iteration.

11. The method of claim 10, wherein the active set's population is not updated until the inner loop's unconstrained iteration converges to satisfy a selected optimality condition.

12. The method of claim 2, wherein the multi-index active-set method uses a conjugate-gradient solver or an LSQR solver.

13. The method of claim 6, wherein said relating said centroid frequency shift Δf to 1/Q may be mathematically expressed by $$\Delta f = f_S - f_R = (n+1)\left(f_0 - \frac{1}{\int_{ray} \frac{\pi}{Qv} dl + \frac{1}{f_0}}\right)$$

where $f_s$ and $f_R$ are centroid frequency for, respectively, the seismic source's amplitude spectrum and the amplitude spectrum as detected by a receiver, v is acoustic velocity, and dl is an increment of ray path.

14. The method of claim 1, further comprising using the solved-for values of Q or 1/Q in seismic imaging for hydrocarbon exploration, or for hydrocarbon reservoir characterization.

15. A ray-based, centroid frequency shift Q tomography method for reconstructing a subsurface model for Q or 1/Q from seismic data measured by receivers in a survey using a seismic source, comprising: using a frequency-weighted exponential function of frequency to approximate the seismic source's amplitude spectrum in order to calculate the spectrum's centroid frequency shift due to earth attenuation, and relating said centroid frequency shift to attenuation by a line integral along a ray path connecting the seismic source to a receiver, said attenuation being represented by the reciprocal of quality factor Q, and solving for Q or 1/Q by iterative, linear optimization performed using a computer.

16. The method of claim 15, wherein the optimization has box constraints to keep estimated Q values within position-dependent ranges specified by upper boundaries and lower boundaries.

17. The method of claim 15, wherein the box-constrained optimization is solved by a multi-index active-set method that allows updates of the active set by multiple grid indices at a time, wherein a grid index denotes subsurface location.

18. The method of claim 15, wherein the frequency-weighted exponential function of frequency has two parameters that are adjusted to provide a fit to the seismic source's amplitude spectrum, said two parameters being a characteristic frequency for bandwidth controlling and a symmetry index, each being a positive real number.

19. The method of claim 18, wherein the frequency-weighted exponential function of frequency can be expressed in the form $$F(f) = Af^n \exp\left(-\frac{f}{f_0}\right)$$

where f is frequency, A is a constant for amplitude scaling, $f_0$ is the characteristic frequency, and n is the symmetry index.

20. The method of claim 15, further comprising using the solved-for values of Q or 1/Q in seismic imaging for hydrocarbon exploration, or for hydrocarbon reservoir characterization.

* * * * *